United States Patent
Ju

(10) Patent No.: US 8,352,686 B2
(45) Date of Patent: Jan. 8, 2013

(54) METHOD AND SYSTEM FOR DATA PREFETCHING FOR LOOPS BASED ON LINEAR INDUCTION EXPRESSIONS

(75) Inventor: Dz-ching Ju, Saratoga, CA (US)

(73) Assignee: Advanced Micro Devices, Inc., Austin, TX (US)

( * ) Notice: Subject to any disclaimer, the term of this patent is extended or adjusted under 35 U.S.C. 154(b) by 380 days.

(21) Appl. No.: 12/724,813

(22) Filed: Mar. 16, 2010

(65) Prior Publication Data

US 2010/0250854 A1    Sep. 30, 2010

(30) Foreign Application Priority Data

Mar. 31, 2009  (DE) .......................... 10 2009 015 750
Nov. 19, 2009  (DE) .......................... 10 2009 046 876

(51) Int. Cl.
*G06F 12/08*    (2006.01)

(52) U.S. Cl. ................. 711/137; 711/125; 711/E12.017; 712/241

(58) Field of Classification Search .................. 711/137, 711/125, E12.017; 712/241
See application file for complete search history.

(56) References Cited

U.S. PATENT DOCUMENTS

2010/0146495 A1*  6/2010  Song et al. ................... 717/160

* cited by examiner

*Primary Examiner* — Yong Choe
(74) *Attorney, Agent, or Firm* — Williams, Morgan & Amerson, P.C.

(57) ABSTRACT

An efficient and effective compiler data prefetching technique is disclosed in which memory accesses may be prefetched are represented in linear induction expressions. Furthermore, indirect memory accesses indexed by other memory accesses of linear induction expressions in scalar loops may be prefetched.

20 Claims, 10 Drawing Sheets

Table 1

| Loop (1000 iteration; i = loop counter) |
|---|
| i = 1,..., 1000 |
| a[i] = b[i] + c[i] |
| next i |

$a_1 \times BIV1 + b_1$
$a_1 \times BIV1 + b_2$ ⟹ partition 1
$a_1 \times BIV1 + b_3$ $a_2 \times BIV2 + c_1$
$a_2 \times BIV2 + c_2$ ⟹ partition 2 partition 1
―――――――――
$a_1 \times BIV1 + b_3$
$a_1 \times BIV1 + b_1$
$a_1 \times BIV1 + b_2$

⋮

FIG. 2i

METHOD AND SYSTEM FOR DATA PREFETCHING FOR LOOPS BASED ON LINEAR INDUCTION EXPRESSIONS

BACKGROUND OF THE INVENTION

1. Field of the Invention

The present disclosure generally relates to techniques and systems for enhancing operation of electronic devices comprising central processing units performing frequent data array accesses.

2. Description of the Related Art

The continuous advance in the field of semiconductor manufacturing resulted in the fabrication of fast and powerful integrated circuits, which may include millions of individual transistor elements. Consequently, highly complex digital circuitry has been developed and used for designing and producing sophisticated central processing units (CPU) wherein increased packing density in combination with reduced power consumption and high internal storage capacity has fueled a plurality of developments in integrating sophisticated CPUs into a wide variety of electronic devices.

Typically, a CPU may be operated on the basis of a dedicated byte code or machine code, which may result in a corresponding change of state of hardware components, such as registers, I/O (input/output) terminals and the like, in accordance with the sequence of machine code instructions. Thus, at the deepest level of a communication between an application and the hardware system, including the CPU or any other data and instruction processing unit, the corresponding sequence of byte code instructions has to be executed by the CPU, thereby providing the desired result in the form of register contents and the like. Due to continuous advances in the process technology typically used for forming complex integrated circuits such as CPUs, performance of digital circuitry has been significantly improved, thereby providing enormous computational resources for performing various tasks. For instance, very complex image processing applications, scientific calculations, including the modeling of complex situations, and the like may be performed on the basis of well-established computer systems including advanced microprocessors. One important aspect in enhancing performance of microprocessors and the like has been seen in continuously increasing the clock signal frequency, i.e., the speed of processing a sequence of machine code instructions one by one. This may typically be accomplished by reducing the feature sizes of individual transistor elements, thereby also reducing the resistance of critical signal paths and the like. Moreover, due to the reduced dimension, interrelated hardware modules may be positioned on a single semiconductor chip at high package density, thereby also contributing to superior operating speed. Moreover, a significant degree of parallelism may be implemented into microprocessor devices by providing a plurality of sub-modules, for instance for enabling the execution of a plurality of instructions in a more or less parallel manner and/or by accessing data arrays in a parallel way.

However, it turns out that the technological advances in microprocessor architectures and manufacturing techniques may not translate into corresponding advances in the performance memory devices in the same way. For example, extremely high bit densities may be attained on the basis of certain memory architectures, such as dynamic RAM devices (random access memory), which, for instance, may comprise a single storage transistor in combination with a charge storing element, such as a capacitor. On the other hand, typically, the high bit density may be associated with a moderately long time interval for accessing the individual memory locations, for instance due to signal propagation delay caused by charging and discharging the storage elements, the corresponding conductive lines connecting the individual memory locations with each other and the like. Hence, despite sophisticated hardware environments, the advantages obtained by a very high operating speed of the central processing unit may be offset by the increased latency induced by the complex memory device. On the other hand, fast memory devices, such as registers and the like, provide very short access time, but may have a higher degree of complexity, for instance in terms of number of transistors, thereby requiring significant floor space on the semiconductor die, if moderately large memory areas are to be integrated into the semiconductor chip. For this reason, typically, appropriate memory space may be provided in close proximity to the processing modules of a processor, however, with a very restricted memory capacity, while other memory devices, such as dynamic RAM devices and the like, may be provided in peripheral areas of the semiconductor chip or may typically be provided as external devices, which may be connected to the central processing unit via an appropriate bus system.

Consequently, by implementing appropriate hardware and software components, the latency induced by a high density storage may be significantly reduced by using fast buffer memories, which may also be referred to as cache memories, in which frequently accessed memory locations of the main memory system may be copied and may thus be made available for the central processing unit without significant latencies. For instance, in very fast cache memories, the operating speed may be determined by the same clock frequency as is used in the CPU core. In order to use a cache memory in an efficient manner, it may be taken advantage of the fact that, in a complex sequence of instructions representing any type of application, certain instructions may be frequently executed two or more times with only several other instructions being executed in between, so that a corresponding block of instructions may be maintained within a cache memory accessed by the CPU and may be dynamically adapted according to the advance of the program. Similarly, in many types of program sequences, the same memory location may be accessed several times within a very restricted sequence of program code so that the corresponding contents may be stored in a cache memory and may be efficiently accessed by the central processing unit at high speed. However, due to the very limited storage capacity of the cache memory, only a small part of the main memory may be maintained within the cache memory at a time.

Consequently, appropriate hardware and software strategies have been developed in order to obtain a high rate of "cache hits," which may be considered as memory operations performed on memory locations, a copy of which is still maintained in the fast cache memory so that memory operations can be executed by using the cache. In other cases, large data arrays may have to be maintained in the main memory, for instance when storing digital images and the like, wherein usually the data may occupy a contiguous sub-array of the memory. Furthermore, in many types of programs, exhaustive data accesses may be required to operate on data arrays, wherein accessing one array item may be associated with accessing another array item that is positioned in the "neighborhood" of the previously-accessed memory location. Consequently, by copying a portion of the neighborhood of the memory location currently being accessed by the central processing unit into the cache memory, there is a high probability that one or more subsequent memory accesses may result in a cache hit. In this manner, the existing gap between microprocessor performance and performance of main memory systems, such as DRAM devices, may be reduced by using appropriate techniques designed to reduce or hide the latency of the main memory accesses on the basis of strategies as described above.

Although these strategies in combination with appropriately designed cache memory hierarchies, i.e., cache memories of different levels of performance, have been very effective in reducing latency for the most frequently accessed data, in still many applications, the entire runtime may nevertheless be substantially determined by wait cycles of the central processing unit due to frequent memory accesses to the main memory system. For example, a plurality of scientific calculations, image processing applications and the like may include large data arrays, which may have to be frequently accessed. In this situation, performance of a computer system may be enhanced by additional strategies, such as optimizing the source code of the application under consideration and the like, wherein processor specific characteristics may be taken into consideration in order to optimize the available resources of the platform of interests. For example, one very efficient tool for optimizing an application is the so-called prefetching technique, in which instructions and/or data may be fetched from the main memory system ahead of the actual execution or processing of the instructions and data in the central processing unit. That is, in case of data prefetching, the main memory system may be accessed in order to copy a portion of a data array into the cache memory, which is expected to be accessed later on in the program. A data prefetching technique may be divided into two categories, that is, software initiated prefetching and hardware initiated prefetching. Software initiated data prefetching may be considered as a technique in which additional instructions may be inserted into the initial program code, which may typically be accomplished on the basis of compiler modules, which convert an initial instruction set, typically provided as a source code written in a high level language, such as C++, Java, Fortran and the like, into a machine code instruction set that is executable by a specific microprocessor platform. For this purpose, typically, the platform may support a type of prefetch instruction which may result in a memory access in order to copy a memory location, typically in combination with the corresponding neighborhood, in the cache memory, while a central processing unit may still execute instructions, which are currently not requiring the contents of the memory location that is presently prefetched. In order to obtain high efficiency of the data prefetching technique, two criteria are to be taken into consideration. First, the data to be prefetched should preferably represent data that would result in a "cache miss" at the time when the corresponding instruction referring the memory location under consideration is executed. For example, any prefetch operations issued for data that are already in the cache memory would result in additional overhead and would contribute to enhanced complexity and thus increased run time. Second, the issuance of the prefetch operation during run time has to be appropriately scheduled so that the data of interest are in the cache memory when a corresponding memory access for this data is executed by the central processing unit. Consequently, an appropriate insertion of prefetch instructions into an existing program code may require a corresponding analysis of the program sequence, wherein any benefits and possible disadvantages caused by the additional instructions may also have to be balanced with respect to each other in order to obtain a significant performance gain during run time of the program.

Promising candidates for enhancing performance by data prefetching by insertion of additional prefetch instructions during compile time are program loops, in which a sequence of instructions may be frequently repeated. For example, when operating on a data array on the basis of one or more loops, which will represent nested loops, depending on the dimensionality of the data array under consideration, the memory accesses may depend on the loop variable, i.e., the loop counter, in a very predictable manner, so that corresponding memory addresses can be identified with data prefetch operations at an appropriate time, that is, at some appropriate number of iterations of the loop of interest ahead so that corresponding data may be available when accessed during a later iteration of the loop. Efficient data prefetching strategies during compilation of the source code have been developed in a context of optimizing loop processing by using a certain degree of parallelism during the program. For example, certain types of loops, or at least portions thereof, may allow parallel processing, for instance by operating on data arrays in a parallel manner, which may in the source code initially be accessed by a single instruction.

FIG. 1 schematically illustrates a table containing a loop defined by a loop counter or loop variable i, which determines the number of iterations of the loop. In the example shown, the loop counter i varies between 1 and 1000 with a step width or stride 1. Furthermore, the loop memory accesses have to be performed on the basis of data arrays a, b and c. Consequently, in the instruction contained in the loop, the data arrays a, b, c have to be accessed in each iteration. Hence, by providing appropriate resources in a microprocessor, the loop of FIG. 1 may be vectorized by performing a plurality of memory accesses in parallel. For instance, if four data items may be processed in parallel, the loop may require only one-fourth of the initial iterations, thereby significantly enhancing overall performance. For this reason, in many processor architectures, appropriate resources are implemented, such as SIMD (single instruction, multiple data) instructions, which are highly efficient in increasing overall processing speed, which may even further be enhanced by data prefetching techniques in order to ensure that data required by the parallel processing are available in the cache memory at the appropriate point in time. Consequently, in sophisticated compiler systems, a mechanism for identifying appropriate candidates for data prefetching and for inserting the corresponding prefetch instructions into the sequence of instructions is usually tied to a vectorization phase during the compilation.

However, other important prefetching opportunities are nevertheless present in loops, which are not selected for vectorization, when corresponding prerequisites for the vectorization mechanism are not fulfilled. Such loops may hereinafter be referred as scalar loops. Scalar loops often involve loop bodies with multiple basic blocks or loops that are unrolled during separate phases of the compiling process. For this reason, the prefetching implementation integrated with a vectorization phase for vectorizable loops cannot be readily extended to deal with scalar loops.

For this reason, in many research activities, mathematical models have been developed in order to track and summarize how array memory locations are accessed by the various loop nests and program constructs of sophisticated applications. The implementation of corresponding modules may require significant effort and may also contribute to extended compilation times, wherein, however, the effectiveness is difficult to predict given the complexity in a memory sub-system and the complex interactions between software and the hardware components.

For example, V. Santhanam, E. Garnish, W. Hsu in "Data Prefetching on the HPPA-8000." *Proceedings of International Symposium of Computer Architecture (ISCA)*, pages 264-273, 1997 disclose a compiler data prefetching framework that targets array element accesses, requiring a complex process strategy. Jeanne Ferrante, Vivek Sarkar, W. Thrash in "On Estimating and Enhancing Cache Effectiveness," *Proceedings of Languages and Compilers for Parallel Computing, 4th International Workshop*, pages 328-343, August 1991, and S. Ghosh, M. Martomosi, S. Milik in "Cache Misequations Having a Compiler Framework for Analyzing and Tuning Memory Behavior," *ACM Transactions on Programming Languages and Systems (TOPLAS)*, Vol. 21, Issue 4, pages 703-746, 1999 proposed two respective modules to track and represent memory access patterns in programs to guide different memory optimizations, which include prefetching. Moreover, C. Luk, T. Mowry, "Compiler Based Prefetching for Recursive Data Structures," *ACM SIGOPS Operating Systems Review*, Vol. 30, Issue 5, pages 222-233, 1996 disclose a research work for generating prefetches for recursive data structures accessed through pointer d references, however, without targeting array accessing or indirect accesses through indexed arrays.

In view of the situation described above, the present disclosure relates to efficient prefetching techniques on the basis of prefetch instructions while avoiding or at least reducing one or more of the problems identified above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the present disclosure provides techniques and systems in which data prefetching may be accomplished in an efficient manner by providing an effective set of heuristics for evaluating loops in a sequence of instructions, i.e., a program code, in particular for non-vectorizable loops. For this purpose, the induction tables associated with each of the loops may be used as a basis for determining appropriate candidates for data prefetching and for eliminating candidates, which may result in redundant cache line fetching. The induction tables of the various loops may typically be established during the compile time of the source code in order to perform certain optimizations, such as loop unrolling and the like. Consequently, the implementation of data prefetching for any types of loops, such as scalar loops, may be accomplished on the basis of available data structures, i.e., the induction tables, thereby reducing additional efforts compared to conventional strategies, while also providing additional flexibility compared to prefetching algorithms implemented in the vectorization phase, since the prefetching technique disclosed herein may be applied at any appropriate phase during compile time as soon as the induction tables are available. Furthermore, in some illustrative aspects disclosed herein, the data prefetching technique may also be efficiently applied to memory accesses that are indexed by other memory accesses in scalar loops. Hence, on the basis of the linear expressions of the induction variables, a very efficient and flexible prefetching technique may be obtained without requiring sophisticated cost models to track and analyze memory accesses in the program, as is typically the case in conventional strategies.

One illustrative method disclosed herein relates to the generation of data prefetch instructions for a processing unit that comprises a cache memory. The method comprises obtaining an induction table for a loop of instructions included in an intermediate set of instructions that is associated with an initial set of instructions representing a program code. The method further comprises determining potential prefetch candidates from each of a plurality of entries of the induction table, wherein the potential prefetch candidates represent induction variables that are usable for a data prefetching operation. The method additionally comprises eliminating one or more of the potential prefetch candidates on the basis of cache memory specific criteria. Moreover, a prefetch instruction may be generated for all non-eliminated prefetch candidates in the loop. Additionally, the method comprises generating a machine code of the intermediate set of instructions, wherein the machine code represents a set of machine instructions executable by the processing unit.

One illustrative apparatus disclosed herein comprises a processor unit and a memory connected to the processor unit. Furthermore, the apparatus comprises a compiler module located in the memory and configured to insert a prefetch instruction into a loop of instructions by determining potential prefetch candidates of induction variables of the loop on the basis of an induction table and by determining associated prefetch distances.

One illustrative storage medium disclosed herein comprises a set of instructions that causes a computer system, upon execution of the set of instructions, to perform the following activities: obtaining an induction table for a loop of instructions included in an intermediate set of instructions that is associated with a source program code; determining potential prefetched candidates from each of a plurality of entries of the induction table, wherein the potential prefetch candidates represent induction variables usable for performing a data prefetch operation; eliminating one or more of the potential prefetch candidates on the basis of cache memory specific criteria of a cache memory to be used in combination with a specified data processing unit; generating a prefetch instruction for all non-eliminated prefetch candidates in the loop; and generating a machine code of the intermediate set of instructions, wherein the machine code represents a set of machine instructions executable by the specified processing unit.

BRIEF DESCRIPTION OF THE DRAWINGS

The disclosure may be understood by reference to the following description taken in conjunction with the accompanying drawings, in which like reference numerals identify like elements, and in which:

FIG. 2i schematically illustrates various partitions of potential candidates, according to illustrative embodiments;

FIG. 2l schematically illustrates a computer system including a memory system containing a compiler module in accordance with the principles disclosed herein.

Figures 1, 2A:
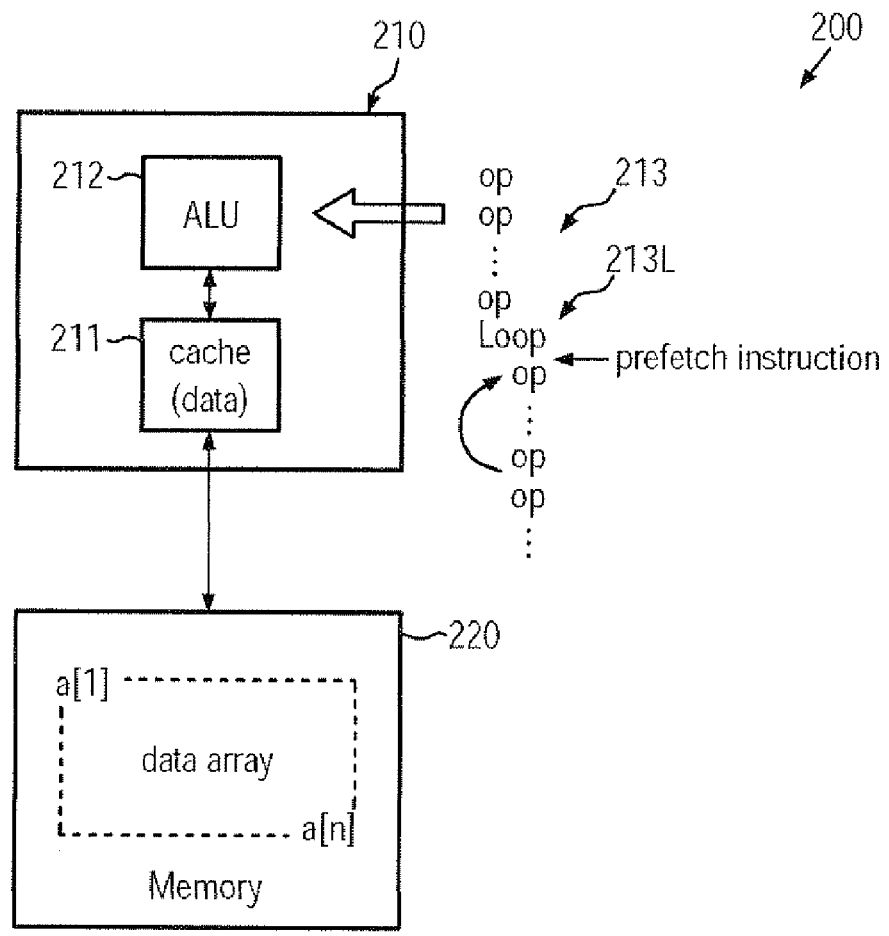
FIG. 1 illustrates a table representing a simple loop of instructions.
FIG. 2a schematically illustrates a processing system, such as a microprocessor in combination with a memory system operated on the basis of a prefetch technique based on linear expressions of induction variables, according to illustrative embodiments.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present disclosure provides systems, techniques and storage media that relate to data prefetching techniques by using linear expressions of induction variables as a basis of identifying potential candidates for the prefetch operation, wherein associated fetch distances may be determined in order to eliminate redundant prefetch operations. Since the techniques disclosed herein are based on data representing the induction variables of the various loops, sophisticated strategies for estimating the loop bodies of the program may be avoided, thereby contributing to enhanced efficiency and flexibility and incorporating the data prefetching technique into compiler modules without being restricted to specific compile phases. Consequently, contrary to many conventional approaches, a moderately small implementation effort may suffice and the overall compilation time may be reduced. Moreover, indirect memory accesses may be prefetched on the basis of the principles disclosed herein.

FIG. 2a schematically illustrates a processing system 200, which may comprise a processing unit 210, such as a CPU, or any other appropriate digital circuit that may perform any arithmetic calculations, and the like as may typically be required for executing complex applications. The processing unit 210 may comprise an arithmetic logic unit 212 in combination with a cache memory 211, for instance a data cache memory, which may have any appropriate configuration with respect to size and operating speed, as previously explained. For instance, the cache memory 211 may comprise a certain number of cache lines, each of which may be represented by a certain number of bytes, such as 64 bytes. It should be appreciated, however, that the principles disclosed herein should not be considered as being restricted to any specific configuration of the processing unit 210 and in particular of the cache memory 211. Moreover, a memory system 220 may be provided, which represents any appropriate storage device, such as a DRAM, a flash memory and the like, which may have a significantly higher latency compared to the cache memory 211, as previously explained. For instance, in the memory 220, a memory portion may be allocated for a data array referred to as array a, which may represent data items of an application that is being executed in the system 200. For example, a sequence or set of instructions 213, which may represent an application or a portion thereof, may be executed in system 200, for instance by retrieving executions from the memory 220, storing at least a certain number of instructions in any appropriate memory within the processing unit 210, and executing the instructions in the unit 212. For example, the instructions 213 may comprise a loop 213L, which may have implemented therein a prefetch instruction in order to appropriately maintain a portion of the data array a in the cache memory 211 at the time, when one or more of the corresponding data items may be accessed by the unit 212. In one illustrative embodiment, the loop 213L may represent a scalar loop, i.e., a non-vectorizable loop, which may be considered as a loop that does not allow a parallel processing. As previously explained, the sequence or set of instructions 213 may have to be provided as a machine code instruction set and specifically adapted to the characteristics of the processing unit 210, which may typically be accomplished by converting the source code of an application into the machine code readable by the unit 210. Due to the complexity of sophisticated applications, a corresponding conversion is performed in an automatic manner by using a compiler system.

Figure 2B:
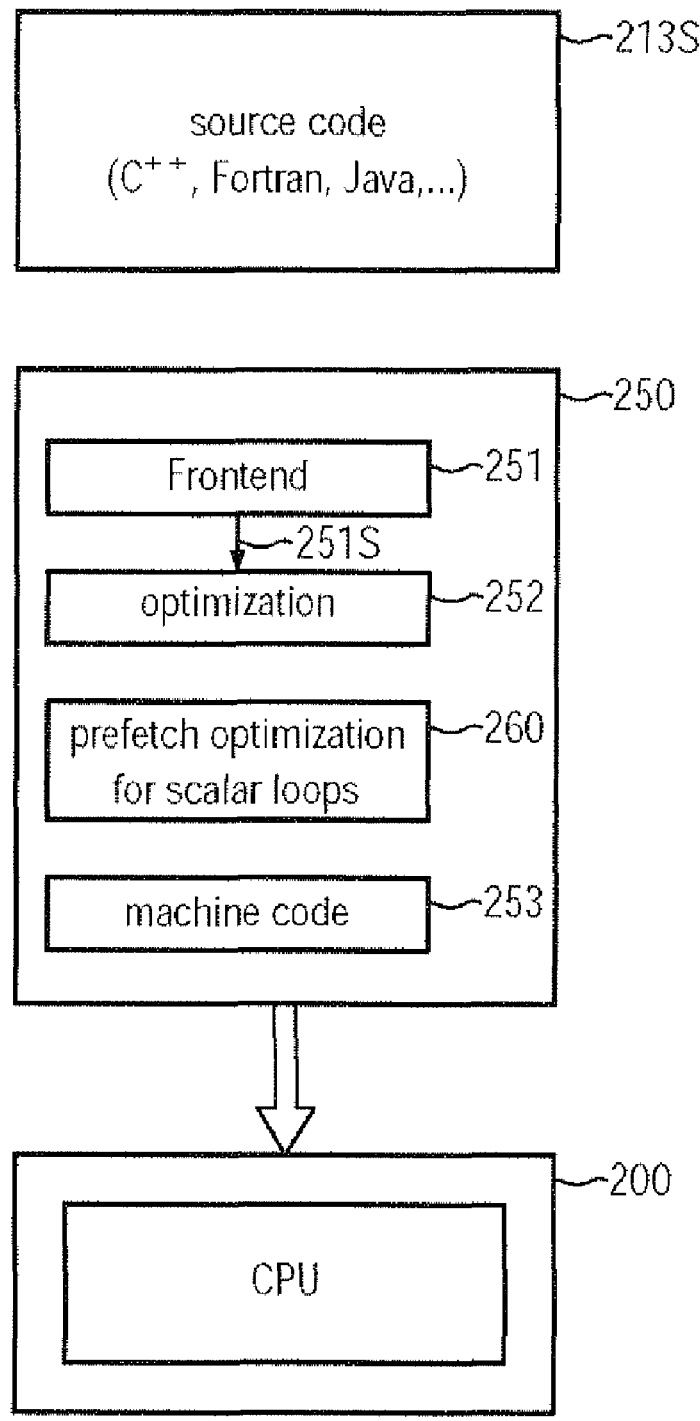
FIG. 2b schematically illustrates a compiler module including a prefetch optimization unit for scalar loops, according to illustrative embodiments.

FIG. 2b schematically illustrates a compiler system 250 according to illustrative embodiments, which may have a plurality of modules 251, 252, 260 and 253. For example, the module 251 may represent a so-called front end module in which a source code 213S may be received and may be converted into an intermediate code of instructions, wherein a plurality of corresponding intermediate code formats are well established in the art. Furthermore, a module 252 may be provided, which may analyze the sequence of instructions provided in an intermediate format 251S in order to enhance performance of an actual machine code instruction set, such as the set 213 of FIG. 2a when executed in a dedicated processor platform, such as the system 200 as shown in FIG. 2a. For this purpose, a plurality of known optimization strategies may be implemented into the module 252. For instance, a loop optimization may be performed on the basis of induction tables and the like. The compiler module 250 may further comprise a prefetch optimization module 260, which may be configured to implement a data prefetch for any types of loops, and in particular for scalar loops. For this purpose, the module 260 may comprise an appropriate mechanism for operating on data structures, such as the induction tables, without requiring sophisticated analysis of loop bodies and the like, as will be described later on. Additionally, the compiler module 250 may comprises a machine code module 253 that may be configured to reduce machine code instructions, such as the instructions 213 of FIG. 2a executable by the system 200.

Figure 2C:
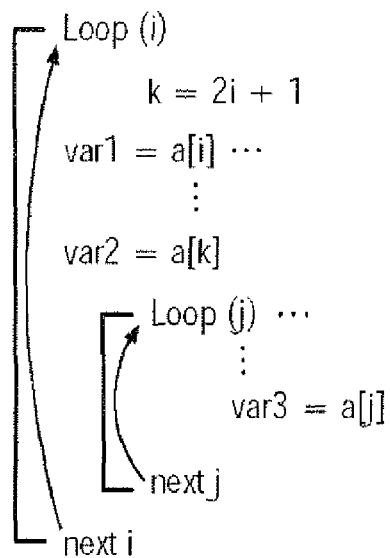
FIG. 2c schematically illustrates nested loops, which may be optimized on the basis of prefetch techniques.

FIG. 2c schematically illustrates, in a simplified manner, a loop as may typically be included in source codes of many types of applications. For convenience, a first or outer loop, indicated as loop (i), may include instructions operating on a data array a based on a loop variable i and a further variable k that may be dependent on the loop variable i. Moreover, a second loop, indicated as loop (j) represents an inner loop and may also operate on the data array a. It should be appreciated that the representations of the loops (i) and (j) may not conform to any established program language and is only for illustrative purposes. As previously explained, data accesses on the basis of loop variables and linear expressions thereof may provide a high degree of predictability of corresponding memory accesses, which may thereby provide convenient preconditions for implementing a data prefetch strategy. For example, in the outer loop (i), variables var1 and var2 may represent operations for accessing the data array a at different addresses, which may be associated with the variables i and k. Similarly, in loop (j), a variable var3 may represent an operation for accessing the data array a based on an address that is associated with the loop variable (j).

During an appropriate phase of a compilation process, each loop defined in the application may be analyzed with respect to induction variables, which represent variables that are increased or decreased by a fixed amount at every iteration of a loop. Furthermore, a linear function of an induction variable may also be considered as an induction variable. In the example shown in FIG. 2c, loop variables i and j, which may be incremented or decremented by a constant amount at every iteration may be considered as induction variables. Moreover, also the variable k, which is a linear function of the loop variable i may also be considered as an induction variable. Consequently, in the example shown, loop (i) includes two induction variables i and k, while loop (j) may have the induction variable j. It should be appreciated that, typically, any number of induction variables may be associated with a specific loop, depending on the complexity of the data accesses.

Figure 2D:
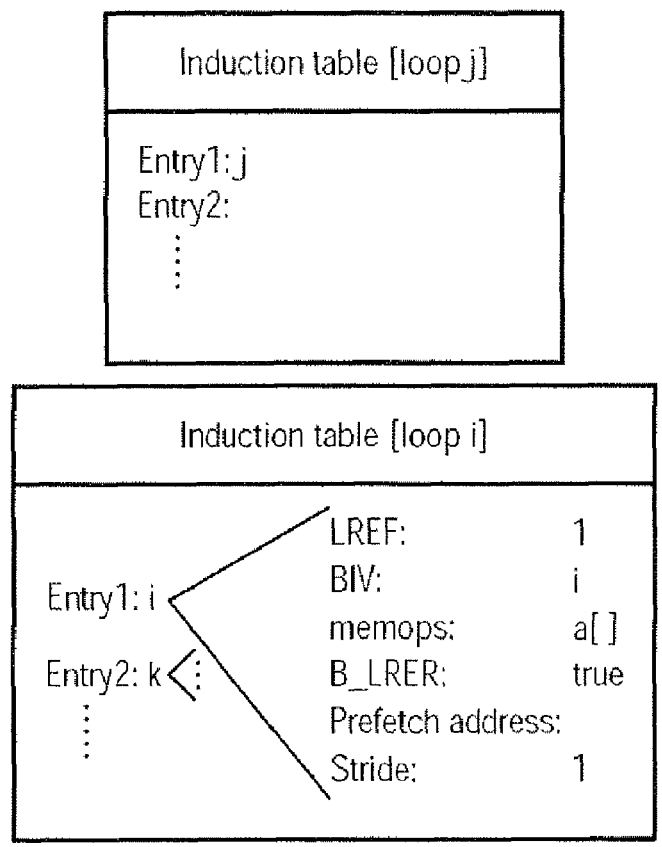
FIG. 2d schematically illustrates induction tables used for determining potential candidates for prefetch operations, according to illustrative embodiments.

FIG. 2d schematically illustrates induction tables associated with the loops (i) and (j) of FIG. 2c. As illustrated, the first induction table may represent the loop (j) and may include corresponding entries for each induction variable. In the example shown, the table may include entries corresponding to the variable j and possible other variables that are, for convenience, not shown. Similarly, a second induction table corresponding to loop (i) at least comprise the entries i and k, while other entries representing any further variables may also be included. Furthermore, each of the entries includes information and attributes for each induction variable. According to the principles disclosed herein, these items can be used in selecting appropriate candidates for a prefetch operation. For example, an attribute is indicated as LREF, which indicates a linear expression for the induction variable of interest based on a base induction variable. Moreover, BIV may indicate the base induction variable, from which the present variable is derived. Moreover, the item B_LRER indicates whether the induction expression is a linear expression or not. A linear expression is to be understood as an expression in the form (a×BIV+b), wherein a and b are constants during compile time. Furthermore, a further item memops points to the memory operations in which the induction variable may be used for address computation. Furthermore, an attribute "prefetch address" may be the expression to provide the address to be prefetched based on this induction variable. Furthermore, the item stride is a further item used, which indicates the increment amount of the induction variable in every iteration of the loop. The stride may be a compile time constant or a variable. The stride may be a positive or negative amount.

Based on the induction tables and the corresponding attributes described above, appropriate potential candidates for prefetching in each loop may be extracted from the induction table associated with a loop of interest.

Figure 2E:
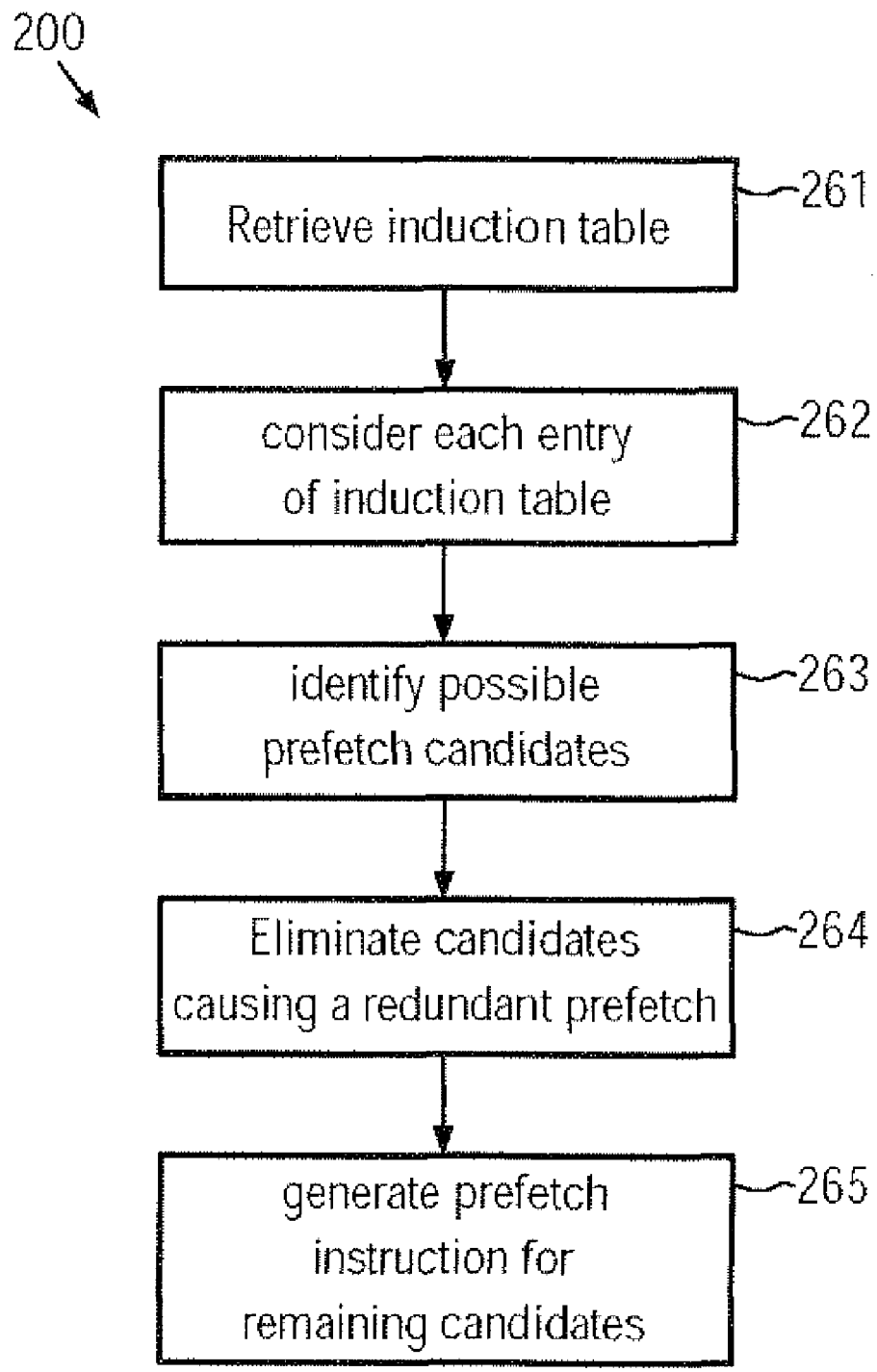
FIG. 2e schematically illustrates a module for inserting prefetch instructions wherein compile phase, according to illustrative embodiments.

FIG. 2e schematically illustrates a plurality of modules for inserting appropriate prefetch instructions to a sequence of instructions, which may, for instance, be accomplished by the prefetch module 260 as shown in FIG. 2b. That is, a prefetch instruction may be inserted into a loop under consideration such that array data may be available in the cache memory at that iteration of the loop at which the data is actually to be accessed. As illustrated, in module 261, the induction table for each loop of interest may be retrieved. In module 262, each entry of the induction table is considered, for instance, in view of the attributes discussed above with reference to FIG. 2d. In module 263, potential prefetch candidates may be identified on the basis of the induction table and the corresponding entries and, in module 264, potential candidates may be eliminated in order to avoid ineffective prefetch operations, for instance prefetching array data, which are already present in the cache memory. Finally, in module 265, prefetch instructions may be generated for the remaining candidates of the loop under consideration.

Figure 2F:
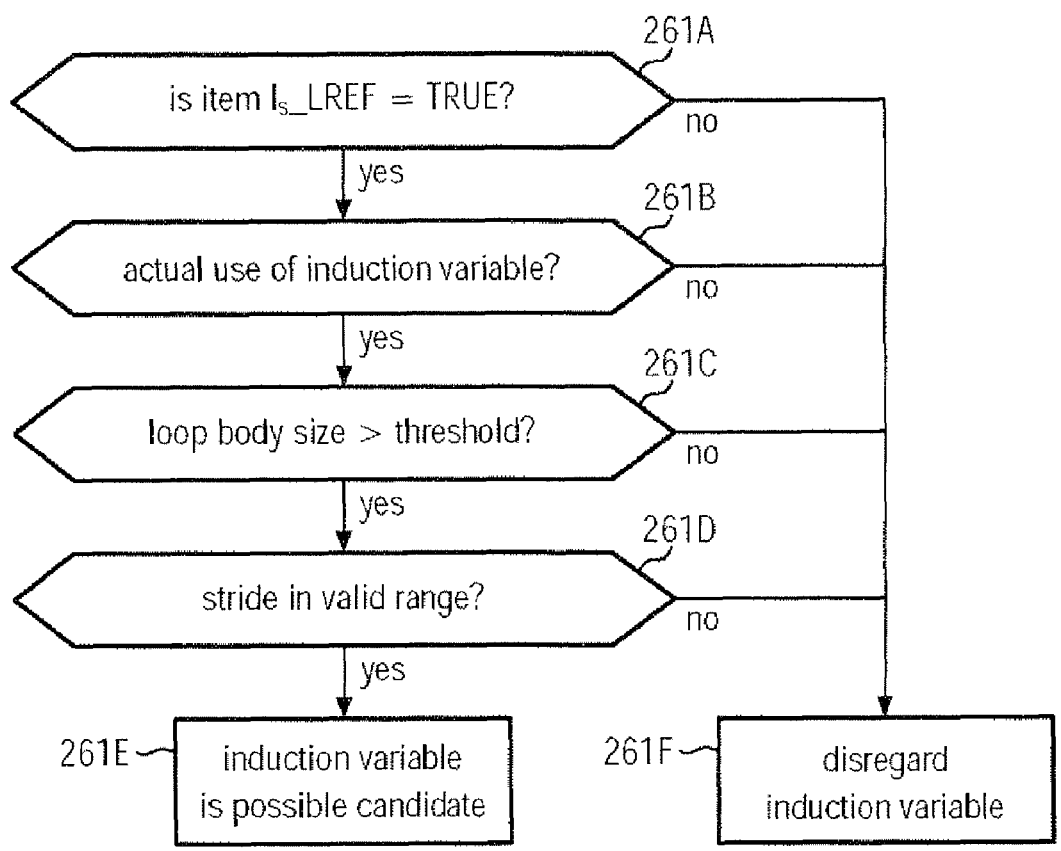
FIG. 2f schematically illustrates a flow diagram for selecting potential candidates for data prefetch on the basis of predefined criteria, according to illustrative embodiments.

FIG. 2f schematically illustrates a flow diagram for identifying potential candidates for prefetching. In step 261A, item Is_LREF may be verified, i.e., it may be determined whether its value is true or false. If Is_LREF is true, the associated induction variable is a linear expression. In this case, the process may advance to step 261B, in which it may be determined whether the induction variable is actually used in the loop. For instance, the corresponding memory operations may be considered in order to determine whether or not the induction variable is actually in use. If the use of the induction variable is associated with a condition, for instance, if the induction variable will be used for accessing the data array based on a specified condition, an appropriate rule may be implemented in order to consider the induction variable as a potential candidate or not. For instance, the condition guarding the array access may be ignored and the induction variable may be considered as "a non-conditional variable." In other cases, dynamic profile feedback information may be used so as to decide whether or not an induction variable may represent a potential candidate. For example, if the profiling information indicates that a condition may be frequently fulfilled, the variable may be considered as a non-conditional variable. If step 261B is true, the process may advance to step 261C, in which it may be verified whether the loop body may exceed a predefined threshold. It should be appreciated that data prefetching may not be efficient or may even reduce performance when performed for loops having a moderately small loop body. For example, a threshold of 15 may be used. However, the threshold may depend on processor specific criteria and the like. The loop size may be considered as the number of internal nodes weighted by the relative execution frequency. If step 261C is passed, then, in step 261D, the stride may be examined with respect to a valid range. For example, an invalid range may be 8 bytes centered around the memory access under consideration. In other cases, an invalid range may be [−256B, 0B]. When the verification in step 261D is passed, the process may advance to step 261E, in which the respective induction variable is marked as a potential candidate for data prefetching. If none of the verifications is met, the process may advance to step 261F, in which the induction variable may not be taken into consideration for a possible data prefetching operation.

Figure 2G:
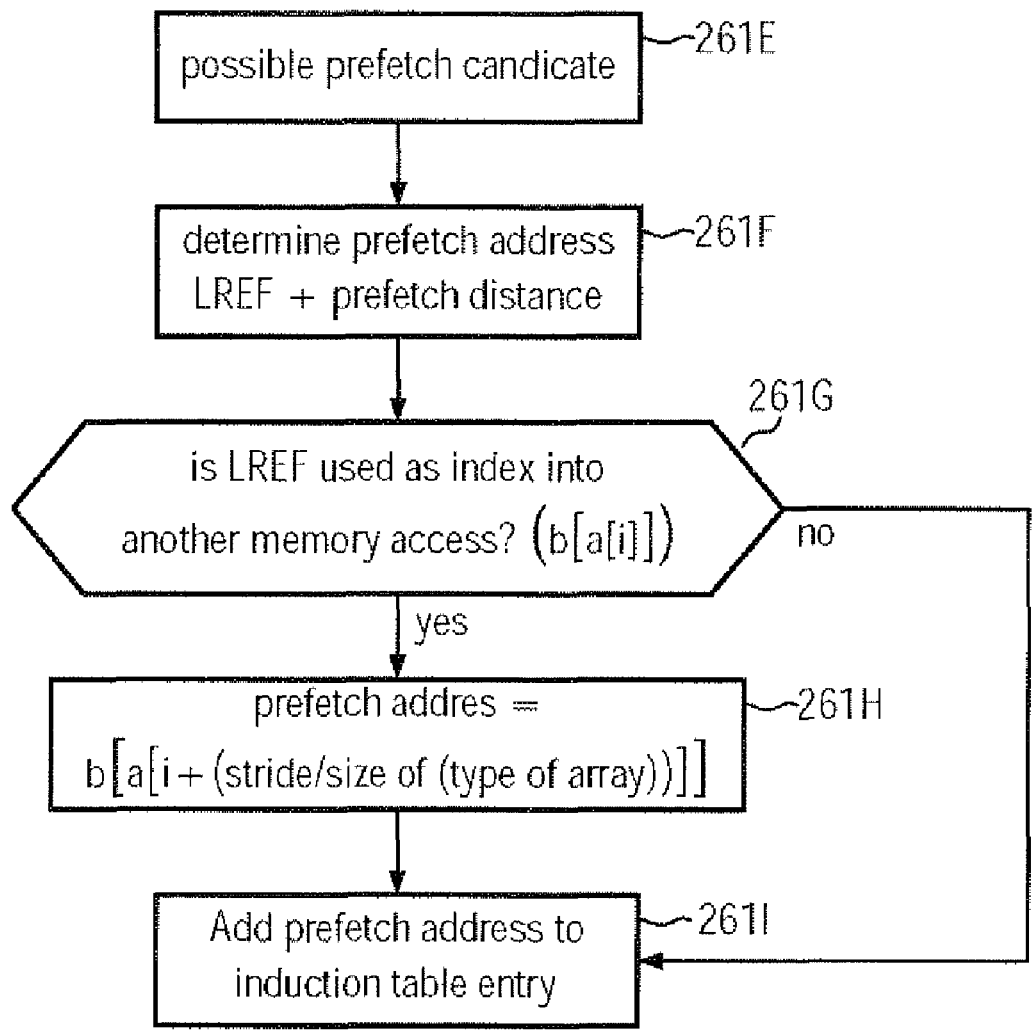
FIG. 2g schematically illustrates a flow diagram for obtaining a prefetch address including emphasis for indirectly accessed data arrays, according to illustrative embodiments.

FIG. 2g schematically illustrates a flow diagram for determining a prefetch address for any potential candidate obtained in step 261E. As illustrated, in step 261F, a prefetch address may be determined on the basis of the linear expression associated with the induction variable that has been identified as a potential candidate, wherein a prefetch distance in terms of bytes may also be added.

In step 261G, it may be determined whether or not the linear expression of the induction variable is used as an index into another memory access. For example, a corresponding memory access may have the form of b[a[i]] so that the contents of the array element a[i] represents the address of an array element of the array b. If the induction variable is used as an index, the process advances to step 261H, in which the prefetch address may be calculated as:

i+(stride/size of (type of array a)

That is, the prefetch address for the memory access of array b may be represented by the array element referenced by the above-specified expression. Thereafter, the process advances to step 261I, in which the prefetch address is added to the associated induction table entry.

Figure 2H:
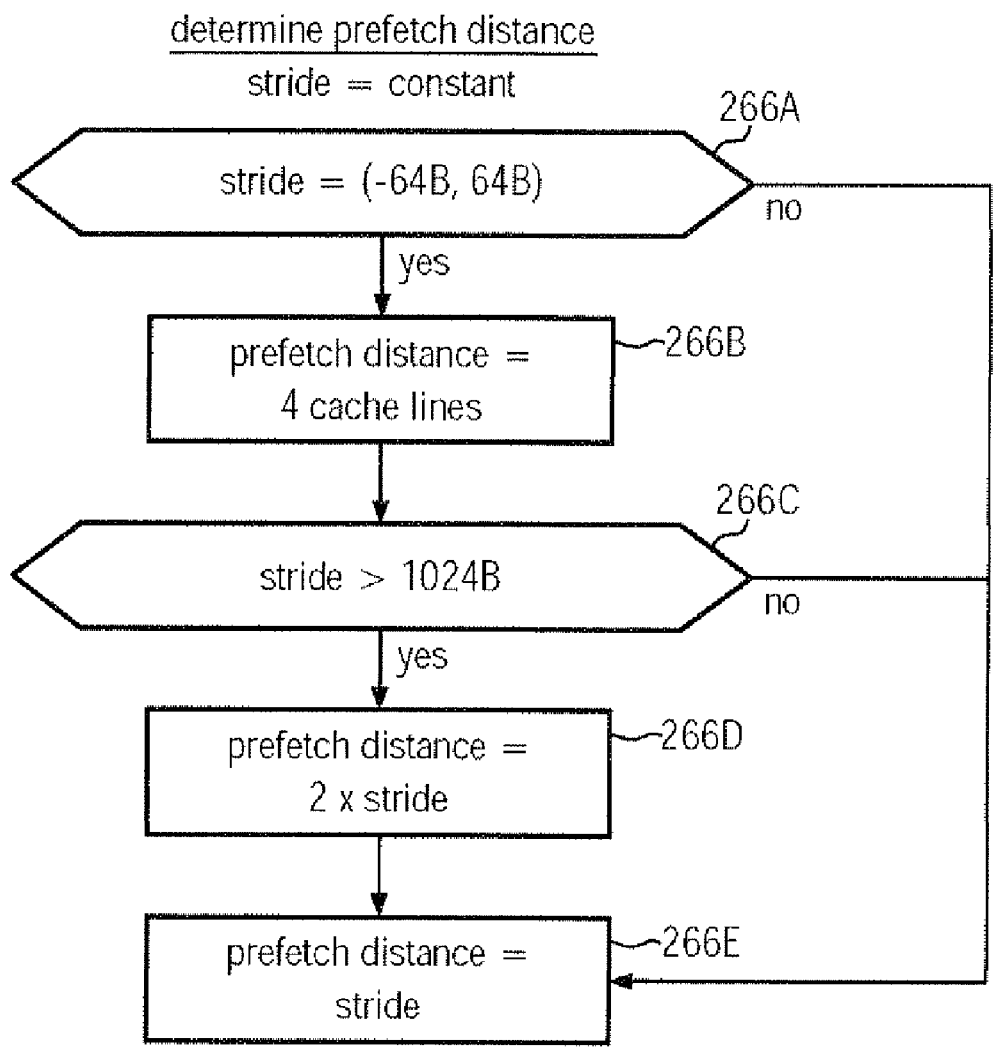
FIG. 2h schematically illustrates a flow diagram for determining a prefetch distance, according to illustrative embodiments.

FIG. 2h schematically illustrates a process for determining the prefetch distance. In step 266A, it may be determined whether or not the stride is equal to (−64B, 64B). If so, the process advances to step 266B, in which the prefetch distance is set to a length of four cache lines. In step 266C, it is estimated whether or not the stride is greater than 1024 bytes, in which case, in step 266D, the prefetch distance is set to two times the stride. In any other case, the prefetch distance is set to the length of the stride in step 266E.

It should be appreciated that the above processes may be performed at compilation time, when the stride is constant. In case of a variable stride, an appropriate expression may be inserted to calculate the stride at run time, for instance, by defining a corresponding variable "measuring" the difference in the stride of two subsequent iterations and using the variable for performing the process steps specified above for a constant stride at run time.

After identifying the potential candidates and determining the corresponding prefetch addresses, one or more of the potential candidates may be eliminated in order to avoid undue prefetch operations.

FIG. 2i schematically illustrates a corresponding scheme for determining candidates to be disregarded for data prefetching. For this purpose, all prefetch candidates previously identified, and which may be represented by an expression a×BIV+b, with identical a and BIV, may be grouped into a specific partition. For example, as illustrated in FIG. 2i, all potential candidates, i.e., induction variables represented by the corresponding linear expression in the form $a_1 \times BIV1$ may be grouped into partition 1. Similarly, any induction variables represented by $a_2 \times BIV2$ may be grouped into partition 2. Consequently, all potential candidates within a specific partition, such as partitions 1 and 2, differ from each other by different coefficients $b_1$, $b_2$, $b_3$, and $c_1$, $c_2$, respectively. It should be appreciated that any number of candidates may fall into a specific partition depending on the number of variables and their linear representations.

In one illustrative embodiment, the candidates of a specific partition may be sorted in increasing order of the coefficients b, as is, for instance, shown in FIG. 2i for the partition 1. In this example, it may be assumed that the following order is obtained: $b_3 < b_1 < b_2$. A corresponding sorting may be performed for each of the partitions.

Based on the various partitions, appropriate candidates may be selected in the following manner. The first candidate is kept in each partition. If the next candidate in a respective partition has an offset b that is less than one cache line from the last remaining candidate of this partition, this next candidate may be removed. This process may be repeated for the rest of the candidates in the partition under consideration.

Figure 2J:
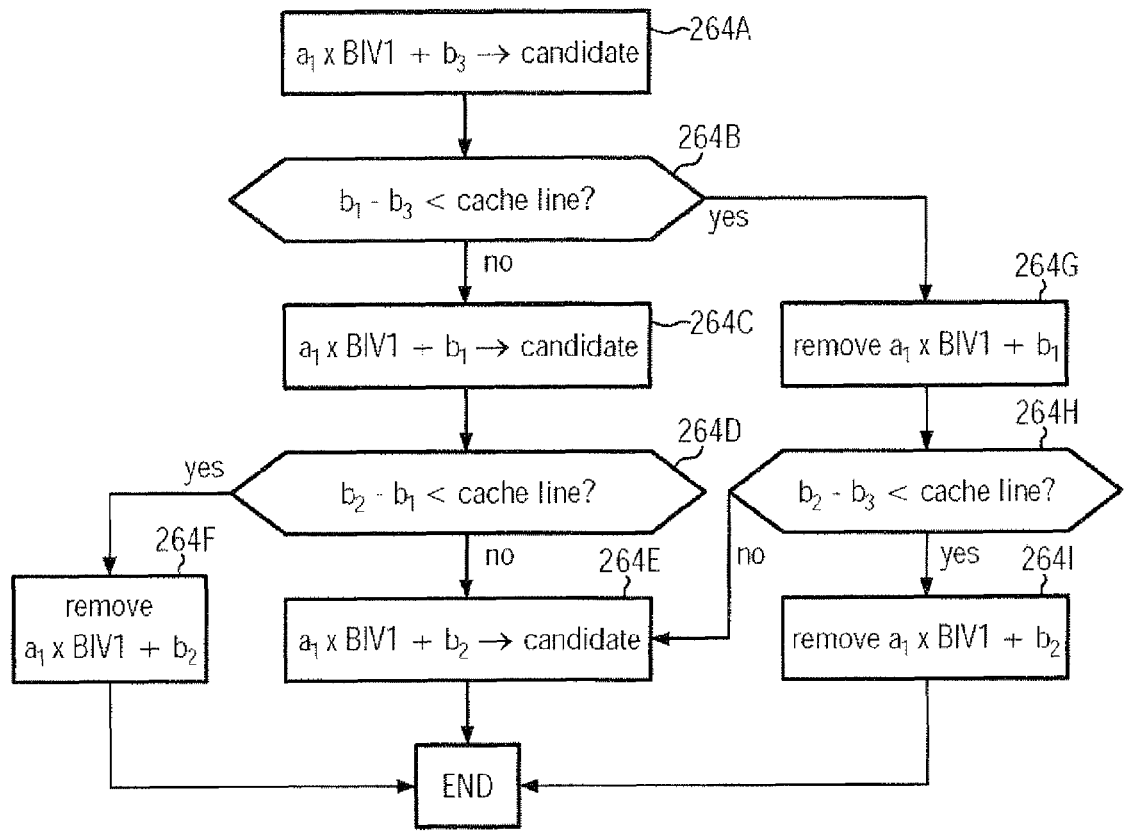
FIG. 2j schematically illustrates a flow diagram for eliminating potential candidates in order to avoid redundant prefetch operations that may fall into the same cache lines, according to illustrative embodiments.

FIG. 2j schematically illustrates a flow diagram for eliminating candidates for the illustrative partition 1 (FIG. 2I), which may cause redundant prefetch operations. It should be appreciated that the flow for eliminating inappropriate candidates may be readily adapted to the number of candidates in any partition obtained as outlined above. In step 264A, the candidate of partition 1 having the coefficient $b_3$ is selected as a candidate. In step 264B, the validity of the next candidate, i.e., in the example shown, the candidate having the coefficient $b_1$, may be tested by determining an offset from the preceding candidate, i.e., the candidate represented by the coefficient $b_3$. If the corresponding offset is less than the size of a cache line, such as, for example, 64B, the process advances to step 264G, in which this candidate is removed, since it would result in an unnecessary prefetch operation. In step 264H, the candidate corresponding to the offset $b_2$ is then assessed by comparing $b_2$ and $b_3$. If the offset $b_2$ is within the cache line, the candidate corresponding to $b_2$ is eliminated in step 264I. If the offset $b_2$ is equal to or greater than the cache line size, the candidate corresponding to the offset $b_2$ is selected as an appropriate candidate in step 264E.

If the offset is equal to or greater than the a cache line in step 264B, the process advances to step 264C, in which a candidate represented by the coefficient $b_1$ is selected as an appropriate candidate. This candidate is then compared with the remaining candidate associated with the offset $b_2$. Therefore, in step 264D, the offsets $b_1$ and $b_2$ are compared with the cache line size. In case of a "no" in step 264D, the candidate corresponding to the offset $b_2$ is selected as an appropriate candidate in step 264E. Otherwise, this candidate is removed in step 264F.

Figure 2K:
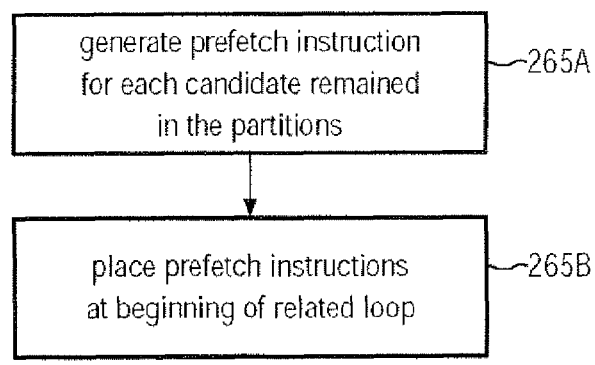
FIG. 2k schematically illustrates the generation of a prefetch instruction.
Figure 21:
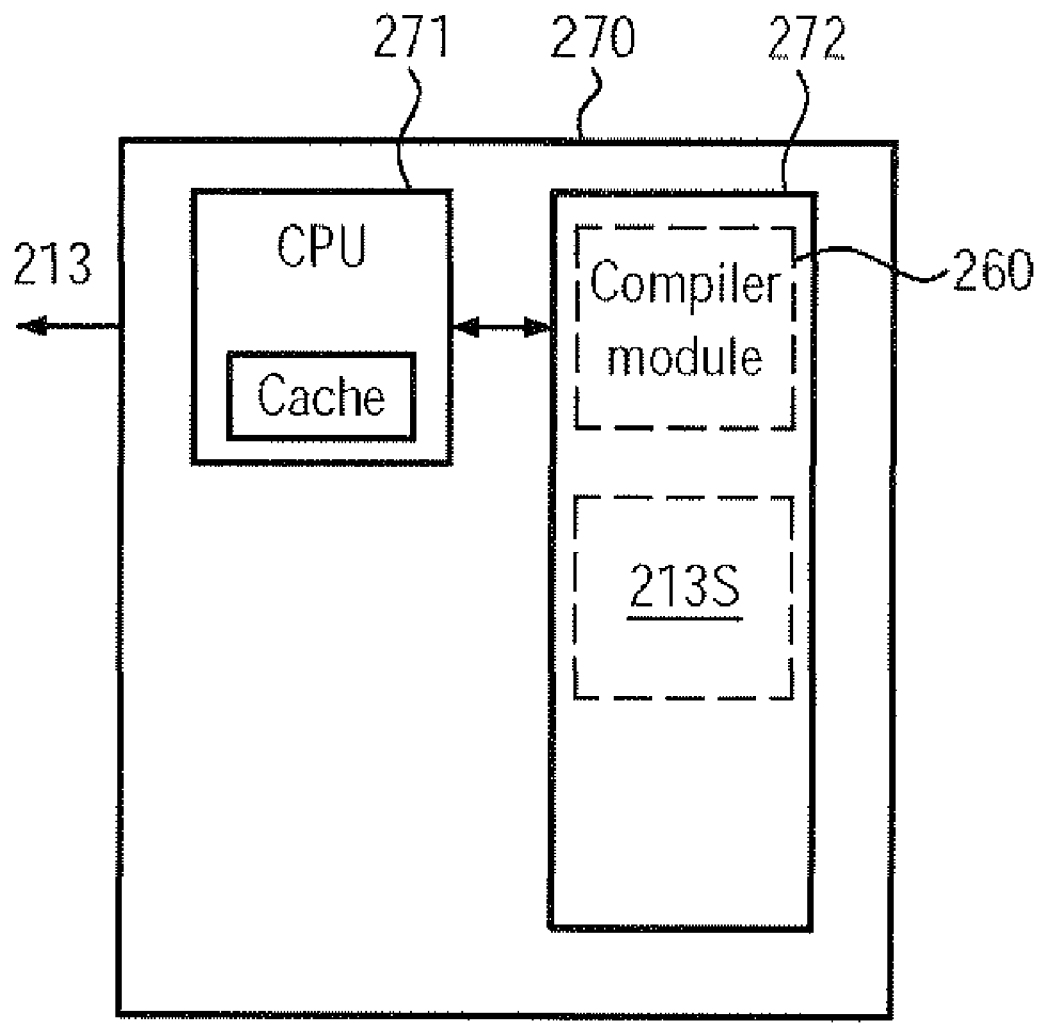

FIG. 2k schematically illustrates a flow diagram according to a process for inserting an appropriate prefetch operation into a related loop. In step 265A, a prefetch instruction is generated for each candidate that has been identified as an appropriate candidate in the one or more partitions previously established. It should be appreciated that appropriate prefetch instructions may typically be supported by the corresponding processor platform and may thus be readily implemented. Thereafter, in step 265B, the prefetch instructions are placed at the beginning of the corresponding loop.

FIG. 2l schematically illustrates a system 270 for generating a machine code program 213 including prefetch instructions, as discussed above. The generated code may then be used in an appropriate platform, i.e., in a processor system comprising a cache memory in combination with working memory, wherein, due to the inserted prefetch instructions, data may be brought from the memory to the cache ahead of the actual use of the data by the processor. For example, the system 270 may comprise a processing unit 271 and a memory system 272, in which a compiler module for enhancing data prefetching may be implemented. For example, the module 260 as previously described may be implemented in the memory system 272. Upon executing the various submodules of the compiler module 260 on the basis of a source code 213S, the CPU 271 may, therefore, generate a machine code instruction set, such as the set of instructions 213 including a loop having a prefetch instruction inserted on the basis of techniques described above. The set of instructions 213 may be used for operating a sophisticated microprocessor platform, such as the system 200 as shown in FIG. 2a, thereby achieving a significant improvement when direct and/or indirect array accesses are to be performed in one or more loops.

As a result, the present disclosure provides an efficient prefetching strategy without requiring a sophisticated cost model, and without requiring the tracking and analysis of array accesses for the programs under consideration. In the present disclosure, simple heuristics in selecting prefetch candidates and determining prefetch distances may be applied. The corresponding loop body may not have to be scanned in order to identify appropriate prefetch candidates. Moreover, the prefetching strategy is decoupled from the vectorization, loop unrolling and many other optimization phases, which may typically be used in well-established compiler techniques. This allows an efficient change in the phase ordering during the compile time, if required, as long as the induction tables are available. Consequently, scalar loops and multiblock loop bodies may be efficiently handled with respect to data prefetching. Furthermore, indirect array accesses through indexed arrays may be prefetched.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of generating data prefetch instructions for a processing unit comprising a cache memory, said method comprising:
   obtaining an induction table for a loop of instructions included in an intermediate set of instructions associated with an initial set of instructions;
   determining potential prefetch candidates from each of a plurality of entries of said induction table, said potential prefetch candidates representing induction variables usable for a data prefetching operation;
   eliminating one or more of said potential prefetch candidates on the basis of cache memory specific criteria;
   generating a prefetch instruction for all non-eliminated prefetch candidates in said loop; and
   generating a machine code of said intermediate set of instructions, said machine code representing a set of machine instructions executable by said processing unit.

2. The method of claim 1, wherein determining potential prefetch candidates comprises verifying predefined attributes of each entry of said induction table.

3. The method of claim 2, wherein verifying predefined attributes comprises verifying linearity of an induction variable represented by a specific one of said entries.

4. The method of claim 3, wherein verifying predefined attributes comprises verifying an actual use of said induction variable in said loop.

5. The method of claim 4, wherein verifying predefined attributes comprises verifying that a loop body size of said loop is greater than a predefined threshold.

6. The method of claim 5, wherein verifying predefined attributes comprises verifying a stride associated with said induction variable is within a valid range.

7. The method of claim 3, wherein determining a potential prefetch candidate further comprises determining a prefetch address on the basis of said induction variable and a prefetch distance and adding said prefetch address to said entry.

8. The method of claim 7, further comprising determining said prefetch distance on the basis of a stride associated with said induction variable and cache memory specific characteristics.

9. The method of claim 7, wherein said prefetch distance is equal to four cache lines when said stride has a length of minus 64 bytes to plus 64 bytes.

10. The method of claim 7, wherein said prefetch distance is equal to two times said stride when said stride is greater than 1024 bytes.

11. The method of claim 7, wherein said prefetch distance is equal to said stride when said stride is equal to or less than 1024 bytes and said stride has a length of other than minus 64 bytes to plus 64 bytes.

12. The method of claim 3, wherein determining a potential prefetch candidate comprises determining a prefetch address on the basis of a stride associated with said induction variable to access a first data array and a size of said first data array when said induction variable is used as an index for accessing a second data array.

13. The method of claim 3, wherein determining a potential prefetch candidate further comprises determining a prefetch address on the basis of said induction variable and a stride associated with said induction variable and adding an expression for calculating an prefetch distance on the basis of said stride at run time when said stride is a variable.

14. The method of claim 1, wherein eliminating one or more of said potential prefetch candidates comprises removing redundant candidates associated with the same base induction variable when said redundant candidates result in prefetching the same cache line of said cache memory.

15. The method of claim 14, wherein removing redundant candidates comprises grouping potential candidates associated with the same base induction variable into a partition and maintaining at least one potential candidate having the smallest offset value in said linear expression associated with said at least one potential candidate.

16. The method of claim 15, further comprising sorting said potential candidates in an increasing order with respect to said offset values in said linear expression.

17. The method of claim 16, further comprising comparing respective two adjacent candidates in said order and remove a candidate having the larger offset value when a difference of the offset values of said two adjacent candidates is less than one cache line.

18. An apparatus, comprising
a processor unit;
a memory connected to said processor unit; and
a compiler module located in said memory and being configured to insert a prefetch instruction into a loop of instructions by determining potential prefetch candidates of induction variables of said loop on the basis of an induction table and by determining associated prefetch distances, wherein the induction table is associated with the loop of instructions and includes an entry for each induction variable in the loop of instructions.

19. The apparatus of claim 18, wherein said compiler module comprises:
a first sub-module configured to obtain said induction table;
a second sub-module configured to determine said potential prefetch candidates from each of a plurality of entries of said induction table;
a third sub-module configured to eliminate one or more of said potential prefetch candidates on the basis of specific criteria associated with a cache memory of a specific processor comprising said cache memory and being configured to execute machine code instructions;
a fourth sub-module configured to generate a prefetch instruction for all non-eliminated prefetch candidates in said loop; and
a fifth sub-module configured to generate said set of machine code instructions from said intermediate set of instructions.

20. A non-transitory storage medium comprising a set of instructions causing a computer system upon executing the set of instructions to:
obtain an induction table for a loop of instructions included in an intermediate set of instructions associated with a source program code;
determine potential prefetch candidates from each of a plurality of entries of said induction table, said potential prefetch candidates representing induction variables usable for performing a data prefetch operation;
eliminate one or more of said potential prefetch candidates on the basis of cache memory specific criteria of a cache memory to be used in combination with a specified data processing unit;
generate a prefetch instruction for all non-eliminated prefetch candidates in said loop; and
generate a machine code of said intermediate set of instructions, said machine code representing a set of machine instructions executable by said specified processing unit.

* * * * *